United States Patent [19]

Scheufler et al.

[11] Patent Number: 6,035,551
[45] Date of Patent: Mar. 14, 2000

[54] AUTOMATED AIR FILTRATION AND DRYING SYSTEM FOR WATERBORNE PAINT AND INDUSTRIAL COATINGS

[75] Inventors: Fred G. Scheufler, Schenectady; Richard D. Scheufler, deceased, late of East Greenbush; by Fred G. Scheufler, executor, Schenectady; William H. Bayard, South Glens Falls, all of N.Y.

[73] Assignee: Optimum Air Corporation, Malta, N.Y.

[21] Appl. No.: 08/925,349

[22] Filed: Sep. 8, 1997

Related U.S. Application Data

[63] Continuation-in-part of application No. 08/625,068, Mar. 29, 1996, Pat. No. 5,709,038, which is a continuation-in-part of application No. 08/423,683, Apr. 18, 1995, Pat. No. 5,554,416, which is a continuation-in-part of application No. 08/126,547, Sep. 24, 1993, abandoned.

[51] Int. Cl.[7] .................................................. F26B 3/00
[52] U.S. Cl. ............................. 34/475; 34/270; 34/271; 427/372.2
[58] Field of Search .......................... 34/270, 271, 443, 34/474, 475, 476, 477, 481, 482, 483, 484, 485, 487, 497, 77; 427/541, 372.2

[56] References Cited

U.S. PATENT DOCUMENTS

| | | | |
|---|---|---|---|
| 250,586 | 12/1881 | Slefe | 432/216 |
| 653,555 | 7/1900 | Hart et al. | 34/74 |
| 1,837,798 | 12/1931 | Shipley | 62/173 |
| 3,694,925 | 10/1972 | Coyle et al. | 34/542 |
| 4,173,924 | 11/1979 | Bradshaw | 454/52 |
| 4,196,526 | 4/1980 | Berti | 34/77 |
| 4,250,629 | 2/1981 | Lewis | 34/380 |
| 4,291,472 | 9/1981 | Lewis | 34/475 |
| 4,324,052 | 4/1982 | Bosher | 34/471 |
| 4,469,720 | 9/1984 | Morris | 427/345 |
| 4,480,393 | 11/1984 | Flink et al. | 34/468 |
| 4,494,317 | 1/1985 | Biagi et al. | 34/73 |
| 4,516,331 | 5/1985 | Yamauchi et al. | 34/77 |
| 4,532,720 | 8/1985 | Uchida | 34/471 |
| 4,603,489 | 8/1986 | Goldberg | 34/77 |
| 4,687,686 | 8/1987 | Stofleth et al. | 427/421 |
| 4,872,270 | 10/1989 | Fronheiser et al. | 34/421 |
| 5,113,600 | 5/1992 | Telchuk | 34/90 |
| 5,119,571 | 6/1992 | Beasley | 34/446 |
| 5,367,787 | 11/1994 | Ikeda et al. | 34/549 |
| 5,554,416 | 9/1996 | Scheufler et al. | 427/378 |

FOREIGN PATENT DOCUMENTS

| | | |
|---|---|---|
| 1264995 | 1/1990 | Canada . |
| 2097186 | 6/1992 | Canada . |
| WO 9508745 | 3/1995 | WIPO . |
| WO9630127 | 10/1996 | WIPO . |

OTHER PUBLICATIONS

Energy Transfer/Conversion; Analyze the Drying Aqueous Coatings; John D. Cary and Edgar B. Gutoff–Polaroid Corp.; pp. 73–79; Reprinted from Chemical Engineering Progress; Feb. 1991.

"Wirtschaftlich und umweltfreundlich trocknen", Hellmann–Apparatus brochure; Apr. 1998 (one page with two–page English translation).

*Primary Examiner*—Henry Bennett
*Assistant Examiner*—Pamela A. Wilson
*Attorney, Agent, or Firm*—Schmeiser, Olsen & Watts

[57] ABSTRACT

An automated air filtration and drying system including an energy and environmental management system for controlling, monitoring and supervising the operation and performance of the air filtration and drying system, a capture apparatus for capturing and controlling overspray, and a drying control module for rapidly drying a coated article using a continuously filtered and dehumidified flow of recycled air.

26 Claims, 12 Drawing Sheets

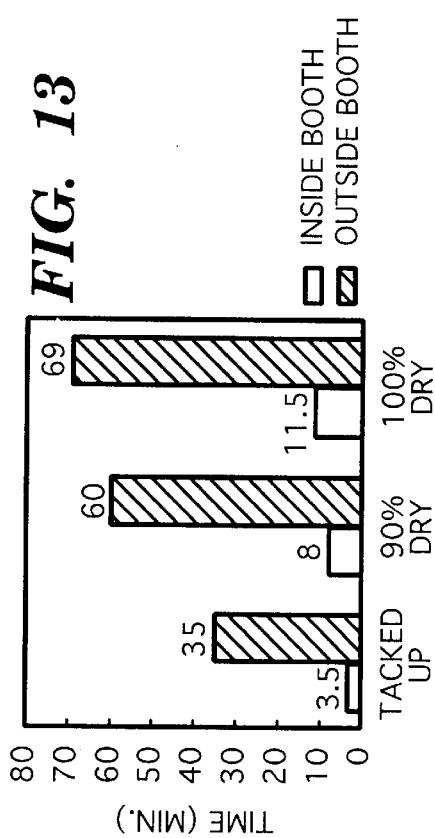
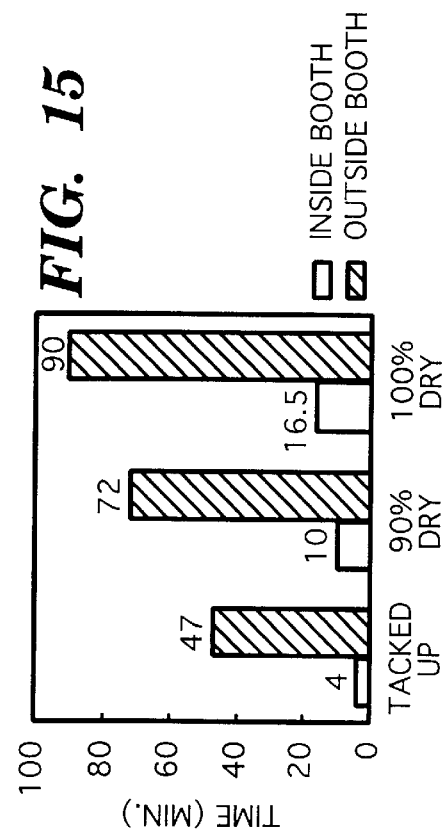
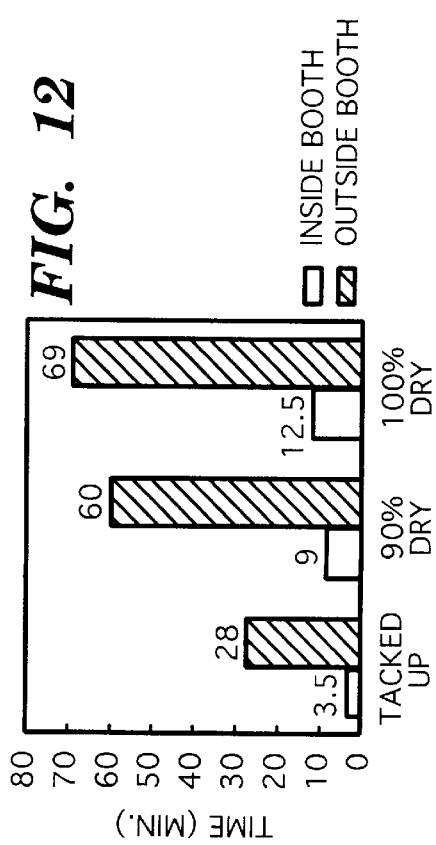
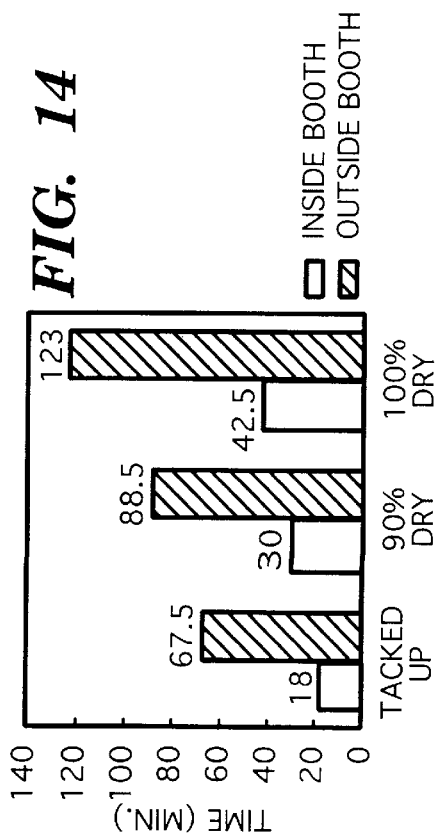

AUTOMATED AIR FILTRATION AND DRYING SYSTEM FOR WATERBORNE PAINT AND INDUSTRIAL COATINGS

The present application is a Continuation-In-Part of application Ser. No. 08/625,068 filed Mar. 29, 1996, now U.S. Pat. No. 5,709,038 which is a Continuation-In-Part of application Ser. No. 08/423,683 filed Apr. 18, 1995, now U.S. Pat. No. 5,554,416 which is a Continuation-In-Part of abandoned application Ser. No. 08/126,547 filed Sep. 24, 1993.

FIELD OF THE INVENTION

The present invention relates to industrial coating systems and, more particularly, to an automated air filtration and drying system which is adapted to drastically reduce the drying/curing times currently experienced in production coating processes by directing a continuously filtered and dehumidified flow of recycled air over a product coated with an aqueous-based (i.e., "waterborne") coating or material. The present invention can be used to dry any type of waterborne coating or material (hereafter generally referred to as a coating), including, but not limited to, paints, primers, adhesives, sealants, inks, waxes, and the like. Further, the present invention is equally effective on waterborne formulations composed, for example, of various acrylic, alkyd, epoxy, esters, or polyester compounds. Also, the present invention may be used to dry waterborne temporary coatings which are temporarily applied to a product. As known in the art, these coatings (e.g., masking coatings) are commonly used to selectively mask portions of a product during a coating process, or to protect a product during handling. When no longer required, these coatings are easily stripped or otherwise removed from the product. Such a waterborne strippable coating may also be temporarily applied to the surfaces within a spray booth to protect the surfaces from the effects of overspray. Another application of the present invention is in the drying of waterborne mold release compounds. As known in the art, these compounds are used to precoat a mold prior to filling with a plastic material to facilitate the subsequent removal of the molded plastic product.

BACKGROUND OF THE INVENTION

An air atomizing spray gun is typically utilized to rapidly apply paints, industrial coatings and other finishing products to a wide variety of industrial, commercial and consumer goods. Unfortunately, a profusion of transient, airborne particles and associated fumes, generally designated as overspray, are produced during the application process. To reduce the potentially serious health risks associated with the inhalation and bodily contact of the overspray, spray booths and other collection systems have been designed in accordance with a plethora of strict regulations set forth by the Occupational Safety and Health Administration (OSHA), the Environmental Protection Agency (EPA), the National Fire Protection Association (NFPA) and a myriad of other governmental regulatory agencies, to collect and effectively treat the discharged air and direct it away from the operators of the spray equipment and other adjacent ancillary personnel. Heretofore, high volume blowers have typically been utilized to draw uncontaminated, ambient air through the coating area, where the air mixes with the overspray, and to duct the air, now contaminated with coating particles and noxious gases, into a treatment area prior to discharge.

A dry filtration system, utilizing arrestor pads, has commonly been employed to remove overspray from the contaminated air stream. As the contaminated air stream passes through an arrestor pad, the larger coating particles impact against the surface of the pad and adhere thereto. As known in the art, the surfaces of the arrestor pad may be covered with an adhesive to facilitate the capture of the coating particles, thereby increasing the capture efficiency of the pad. The proper performance of arrestor pads in removing particles from a contaminated airstream is heavily dependent on frequent operator inspection and regularly performed maintenance. If the required inspections and maintenance are not performed according to specifications, arrestor pad blow by and an unintentional discharge of contaminants to the surrounding environment may occur.

A water-based overspray collection system, commonly designated as a water downfall system, utilizes a cascading curtain of water to remove overspray particles from a collection wall. The contaminated water is temporarily stored in a sump or collection tank and is subsequently pumped through a filter to remove any particles suspended therein. The filtered water may be reused in the water downfall system or may be discharged to a water treatment system or the environment. Prior to any discharge, the water must normally go through an expensive and time-consuming neutralization process, wherein any remaining particles in the water are allowed to sink to the bottom of the collection tank, thereby forming a concentrated sludge or cake that must be removed and disposed of on a regular basis.

The above-described overspray collection systems are moderately effective in the removal of larger overspray particles from the spray booth collection area. Unfortunately, they are not effective in the collection of submicron size particles and gases which are eventually discharged to the outside air, potentially creating an environmental hazard.

Solvent-based coatings have commonly been utilized in finishing processes due to the fast drying characteristics of the solvents. As the solvents evaporate, the coating solids suspended therein flow together and form a continuous layer of dry solids. A major disadvantage of solvent-based coatings is the explosion hazard created by the inherent flammability of the solvent and the associated solvent fumes which are released during the evaporation process. Additionally, the solvent fumes discharged to the atmosphere pose an environmental hazard due to the interaction of solvents with the ozone layer. As such, alternative coating processes utilizing dry powders, high solids and waterborne solids have been developed to avoid the disadvantages associated with solvent-based coatings.

In a dry powder coating process, an electrostatic spray gun assembly having a positive polarity is utilized to apply dry powder solids to a product having a negative polarity. Due to the resultant mutual attraction of the positively charged paint particles and the negatively charged product, overspray is substantially reduced. After receiving the dry paint particles, the coated product is baked at a high temperature until the dry paint particles melt and flow about the product, thereby forming a continuous coating. Such systems require substantial investment for equipment and have limited use due in part to the required baking step.

High solids coating systems utilize a high viscosity paint emulsion having a high solids to solvent ratio. As a result, the paint emulsion is generally applied to a product with a high pressure spray nozzle which inherently produces a substantial amount of overspray. The coated product is subsequently dried in a separate drying area using a heat source such as an oven or heat lamps. As with the above-described powder coating systems, a high solids coating system requires a substantial investment for equipment and has limited use due to the required heating step.

In a waterborne solids wet system, the coating solids are suspended in a fluid having a relatively high water to solvent ratio. Although the equipment required for this type of coating system is generally less expensive and complex due to a lower curing temperature, the required drying/curing times are generally much longer than with solvent or dry powder-based coatings.

As stated, currently available collection systems are generally designed to discharge large quantities of air to the outside environment. Unfortunately, this results in higher energy costs since additional energy must be expended to recondition the indoor building air. In addition, the residual pollutants in the discharged air are closely regulated by local and federal agencies, oftentimes requiring the procurement of a plurality of costly permits and/or the payment of large fines. These energy and regulatory requirements oftentimes add considerable cost to the price of a finished product.

Over the last decade, the use of high solvent-based coatings has drastically decreased due to the ever increasing number of regulatory restrictions on the emission levels of contaminated air into the environment. As such, the popularity of dry powder, high solids, waterborne and other alternative coatings has increased tremendously. Due to the high investment cost and limitations of the dry powder and high solids coatings, waterborne coatings stand out as the best alternative for economical use. As stated above, one of the major disadvantages of a waterborne coating system is the requisite longer drying cycle which results in substantially increased production costs.

SUMMARY OF THE INVENTION

In order to avoid the disadvantages of the prior art, the present invention provides an automated air filtration and drying system for products coated with any type of waterborne coating. Such waterborne coatings may include, for example, paints, primers, adhesives, sealants, masking materials, temporary coatings, inks, waxes, mold release coatings, and the like. Further, the waterborne coatings may include formulations composed, for example, of various acrylic, alkyd, epoxy, esters, or polyester compounds.

The present invention provides a drying booth operably coupled to a drying/filtration module or apparatus via an interface wall. The drying/filtration module can be used to filter overspray during a coating operation or to provide recycled air that is filtered and dried to accelerate the drying process, or both. Additionally, the present invention incorporates an energy and environmental management system for controlling, monitoring and supervising the operation and performance of the air filtration and drying system, a capture apparatus for capturing and controlling airborne iron phosphatizing particulates, waterborne coatings, mists and other airborne particulates, and a drying control module for rapidly drying a coated article using a continuously filtered and dehumidified flow of recycled air. Advantageously, the automated air filtration and drying system of the present invention are adapted to drastically reduce the drying times currently experienced in production coating processes, automatically regulate and control the application and emission of waterborne coatings, and substantially reduce energy operating costs.

The energy and environmental management system is an automated management and control system which is adapted to optimize the performance of the capture apparatus and the drying module while minimizing the energy consumption of the air filtration and drying system. In a typical application, the energy and environmental management system includes a host computer, a plurality of peripheral interface panels, a plurality of input/output interfaces and a number of sensors for monitoring and measuring a wide variety of conditions throughout the air filtration and drying system and associated spray booth. Examples of the aforesaid conditions are listed below:

a) Collection area face velocity.
b) First stage filtration static pressure.
c) Main filtration static pressure.
d) Ambient temperature.
e) Ambient humidity.
f) Induced humidity.
g) Elapsed real time.
h) Electrical service status (voltage, amperage, polarity).
I) Motor amperage draw.
j) Pre-filtration particulate count.
k) Post-filtration particulate count.
l) Pre-filtration gas phase.
m) Post-filtration gas phase.
n) Volatile organic compounds (presence, breakthrough).

The capture apparatus of the instant invention is adapted to effectively remove overspray contaminants from the air within a spray booth, thereby virtually eliminating the release of any deleterious contaminants into the atmosphere and surrounding work environment. Preferably, the capture apparatus is designed to provide a minimum airflow of 100 feet per minute across the cross-sectional area of the spray booth collection area and a capture wall capacity of 10,000 to 100,000 CFM at 1.5 to 3.0" W.G.

The capture apparatus is equipped with a blower, such as a backward inclined curved vane blower impeller or the like, for drawing contaminated air from the collection area of the spray booth into a dry type multi-stage filtration system, wherein the filtered air is either expelled into adjacent work areas during a coating or regeneration cycle or returned into the collection area during a drying cycle, under control of a computer controlled damper system.

The energy and environmental management system includes a process control system for optimizing the performance of the capture apparatus by monitoring and controlling the operation of the blower motor. More specifically, the process control system incorporates a motor amperage feedback loop and variable frequency drive system, such as the ACS 500 drive system manufactured by ABB Industrial Systems, Inc., for regulating the speed (rpm) of the blower motor to compensate for increased static pressure due to filtration loading. As a result, the present invention automatically provides constant regulation of airflow volume and face velocity regardless of filter loading, thereby reducing required drying/curing times. Any amperage increases of 5% or more above preset optimum amperage conditions (application specific) are detected by the process control system and result in the initiation of a self-diagnostic subroutine, the production of a record data log entry for future analysis and the generation of a preprogrammed service request.

The dry type multi-stage filtration system incorporates a plurality of filter systems arranged in parallel, each of said filter systems having a plurality of serially arranged dry-type filters. This highly efficient serial arrangement of filtering components includes arrestor pads, secondary and primary prefilters, a main high efficiency filter and an odor absorbing gas phase filter. Detailed descriptions of the filtering components utilized in the preferred embodiment of the present invention are set forth in the following paragraph.

The arrestor pads are formed of a synthetic poly fiber material or have a multi-layered construction, and are composed of slit and expanded heavy water resistant kraft with multistage designed baffle openings and duo-density singed synthetic backing. The secondary prefilters are constructed of a pleated media enclosed in a water resistant cardboard frame and has a 25 to 60% nominal efficiency (arrestance) on ASHRAE TEST 52-76 Dust Spot, which, as established by the American Society for Heating, Refrigeration and Air Conditioning Engineers, is a measure of the ability of a filter to reduce soiling of both fabrics and building interior surfaces. Similarly, the primary prefilter is formed of a 35 to 75% minimum ASHRAE pleated media enclosed in a water resistant cardboard frame. The main filter includes a high efficiency pleated media or High Efficiency Particulate Air Filter (hereinafter referred to as H.E.P.A.) having a 90 to 99% efficiency on 0.3 micron particulate and a penetration efficiency of no more than 10% on 0.3 micron particulate in accordance with ASHRAE sodium flame method test B53928/M7605. Finally, the odor absorbing gas phase filter, which provides gas control to 0.00003 microns in size, employs coarse fiber substrates with an 80% retention porous structure in reticulated carbon media, wherein one cubic foot of substrate provides approximately 2 million square feet of surface area for adsorption. As should be readily apparent to one of ordinary skill in the art, many other filtering components or combinations thereof may be utilized in lieu of those described above without departing from the scope of the present invention.

The drying/filtering module may be configured such that it includes an intake (or exhaust) vent and an outlet (or return) vent on a single interface wall. This configuration provides a simple means of interfacing or attaching the module to a drying booth. Moreover, it allows for an even recirculation of air in the drying booth. Furthermore, with this configuration, the drying booth can maintain its temperature and humidity levels even with an open wall opposite of the interface wall. Between the intake and outlet vent is an airflow recycling system that includes an air passageway that will exhaust filtered air into the outside work area during a coating cycle and return filtered, dry air during the drying cycle.

Various types of drying/filtering modules may be incorporated into the present invention depending upon specific application requirements and conditions. A first type may incorporate a regenerative twin tower dryer, a rotary continuous air dryer, a rotary refrigerant continuous air dryer or a desiccant/deliquescent multiplex unit. This type of drying/curing module is adapted to direct a continuously recycled, heated and dehumidified flow of air over a coated product to absorb and eliminate moisture. A second type may incorporate a refrigeration-based dehumidification drying system. This type of system recirculates air that is chilled below its dew point temperature to give up moisture in the form of condensation on a nearby surface.

Advantageously, in either type of system, the contaminant concentration and humidity of the recycled air are continuously lowered as it cycles over the coated product, through the capture apparatus and through the drying/curing module. In applications requiring continuous operation and desiccant media, regeneration of the media occurs during system down or lag times. Contrastingly, refrigerant dryers are adapted to be operated continuously and thereby require no regenerative stage.

In a first embodiment of the present invention, a regenerative twin tower dryer is utilized to heat and dehumidify the spray booth air during the drying process. As known in the art, a regenerative twin tower dryer utilizes a pair of adsorption columns in an alternating manner, thereby allowing one column to be in use while the second is regenerating. The geometry, size and desiccant bed configuration of the regenerative twin tower dryer system is carefully tailored in accordance with application specific criteria such as adsorption capacity, humid air velocity, retention time, operating cycle, drying efficiency, energy consumption, drying rate and the like. Further, minimum and maximum performance parameters are specifically assigned to accommodate specific operating variables such as media generation rate, meteorological conditions and spray equipment performance.

In a second embodiment of the present invention, a cooling or refrigeration-based dehumidification unit is utilized to cool and dehumidify the spray booth air during the drying process. As mentioned, recirculated air that is chilled below its dew point temperature gives up moisture in the form of condensation on the nearest surface it encounters. Thus, the air in the system is dehumidified during the cooling and condensing cycle. The cooling and refrigeration unit may be comprised of: 1) an evaporator or cooling coil; 2) a compressor; 3) a condenser or reheat coil; 4) a liquid refrigerant and receiver tank; 5) an expansion tank; 6) a remote condenser; and 7) a humidifier. The reheat coil and remote condenser provide a means by which the temperature of the air in the system can be precisely regulated without turning the system on and off. The humidifier provides a means by which the system can regulate the relative humidity of the air.

This embodiment may be used to pretreat the product surface (i.e., remove moisture prior to the application of a waterborne coating) and/or post-treat the product surface (i.e., remove the application after the application of the waterborne coating). Moreover, in providing a drying module that does not incorporate a heating system, this particular embodiment has the further advantage of more easily meeting existing fire safety standards. For example, both NFPA and OSHA provide various regulations regarding the use of heat or hot surfaces in or near a spray both. (See, e.g., OSHA §1910.107 and NFPA 33). Thus, this embodiment provides an effective means of drying while providing a safe environment.

BRIEF DESCRIPTION OF THE DRAWINGS

These and other features of the present invention will become readily apparent upon reading the following detailed description and upon reference to the drawings in which:

FIG. 12 is a bar graph comparing drying times for a product in and out of a booth built in accordance with this invention;

FIG. 13 is a bar graph comparing drying times for a product in and out of a booth built in accordance with this invention;

FIG. 14 is a bar graph comparing drying times for a product in and out of a booth built in accordance with this invention;

FIG. 15 is a bar graph comparing drying times for a product in and out of a booth built in accordance with this invention;

DETAILED DESCRIPTION OF THE INVENTION

Referring now specifically to the drawings, in accordance with the present invention, there is illustrated a first (FIGS. 2–4) and second (FIG. 1) embodiment of an automated filtration and drying system, generally designated as 10, wherein like reference numbers refer to like parts throughout the drawings.

Figure 2:
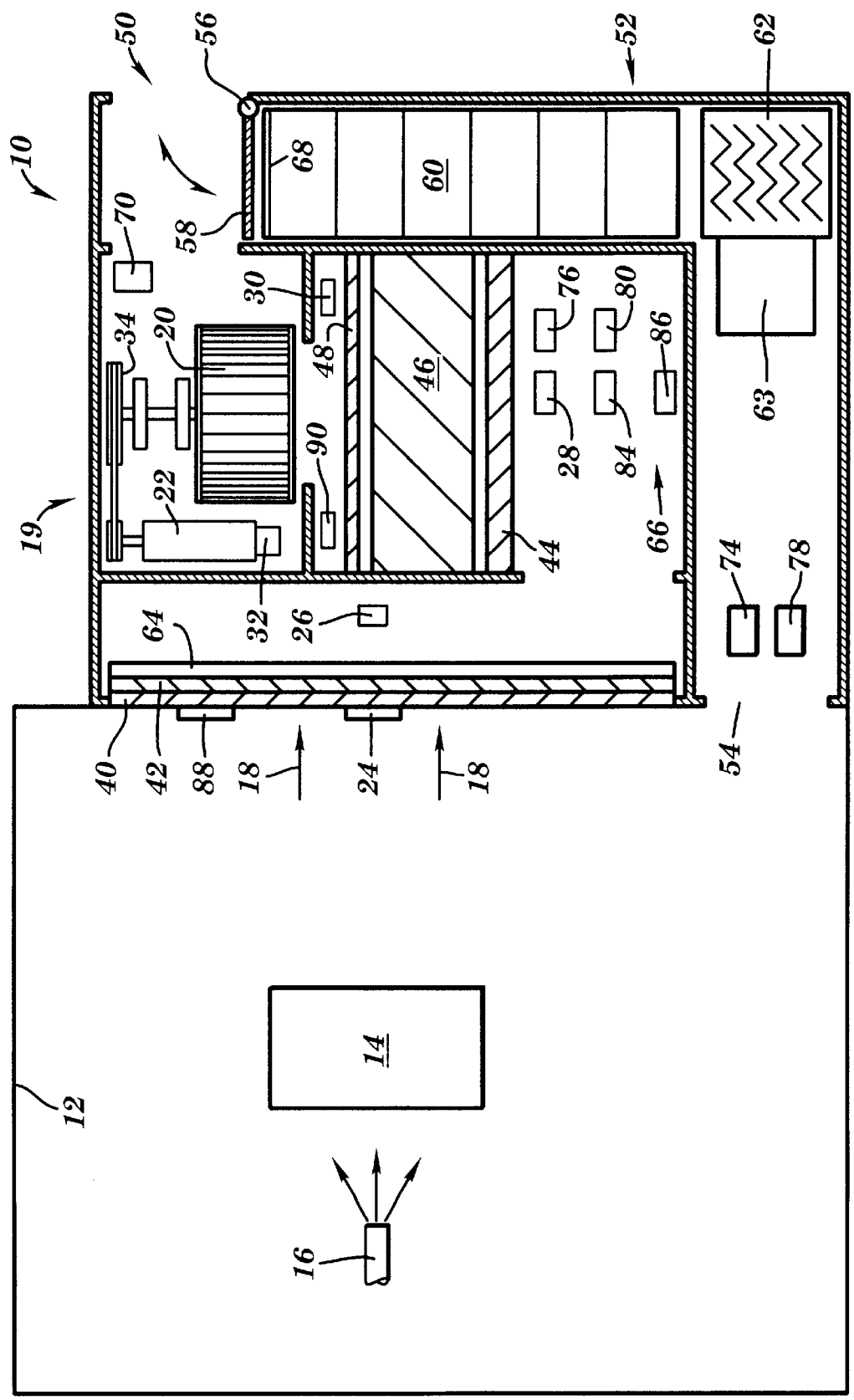
FIG. 2 illustrates an automated air filtration and drying system for a spray booth in accordance with a first embodiment of the present invention.

As illustrated in FIG. 2, the automated filtration and drying system 10 is adapted to be utilized in conjunction with a spray booth 12 to remove any overspray produced while coating a product 14 with a spray gun 16 or other suitable applicator.

Figure 3:
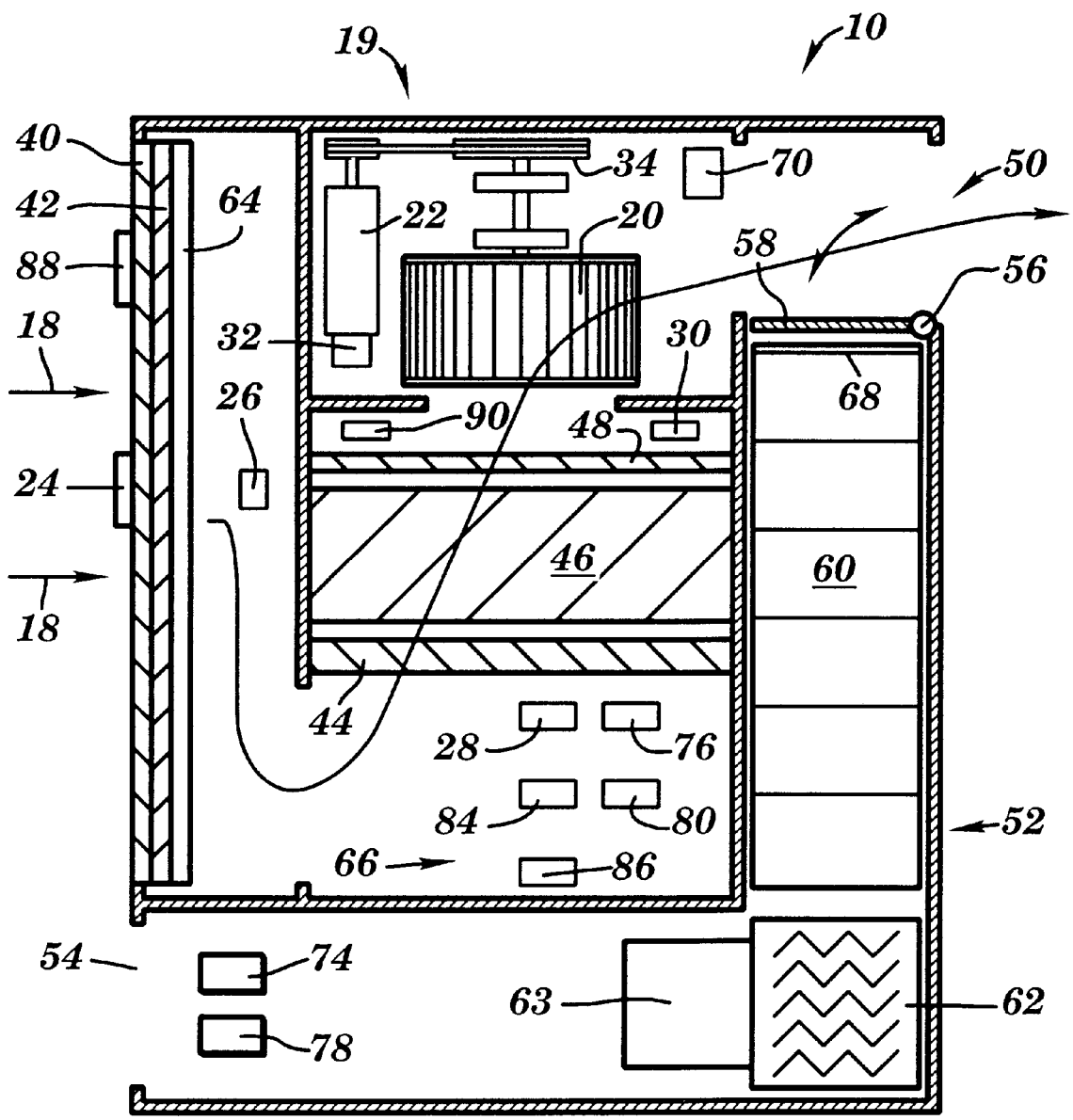
FIG. 3 illustrates the coating cycle airflow path through the automated air filtration and drying system of FIG. 2.

Referring to FIGS. 1–4, contaminated air is drawn into a capture apparatus 19 within the automated filtration and drying system 10, as indicated by the directional arrows 18, by a backward inclined curved vane blower impeller 20 and associated blower motor 22. A computer regulated motor amperage feedback loop, including a pair of first stage static pressure sensors 24, 26, a pair of main filter static pressure sensors 28, 30, a motor amperage draw/rpm sensor 32 and a computer controlled variable frequency drive system 34, is provided to regulate the speed of the blower motor 22 to compensate for increased static pressure due to filtration loading, and variations in supply voltage. As indicated in FIG. 3, the outputs of the static pressure sensors 24, 26, 28, 30 and the output of the motor amperage draw/rpm sensor 32 are provided to a system host computer 36 through a peripheral interface panel assembly 38. In response thereto, the host computer 36 provides the appropriate speed compensation signal to the variable frequency drive system 34, again through the peripheral interface panel assembly 38.

More specifically, as the total differential static pressure between the pair of first stage static pressure sensors 24, 26 and the pair of main filter static pressure sensors 28, 30 increases due to filtration loading, as determined by the host computer 36, the speed of the blower motor 22 is increased accordingly via the variable frequency drive system 24, thereby providing a predetermined (application specific) constant airflow volume and airflow velocity through the capture apparatus 19. Analogously, the speed of the blower motor 22 is modified in accordance with variations in the supply voltage to again provide the requisite constant airflow volume and velocity. The motor speed may be adjusted in a continuous manner or in response to predetermined variations in static pressure levels.

Static pressure sensors 24, 26, 28, 30 preferably comprise a Pitot tube having a closed end and a plurality of radial holes disposed proximate a static pressure tip, wherein the holes are presented to the airflow stream at 90 degrees, thereby providing an accurate static pressure reading. The static pressure tip is connected through flexible tubing to a pressure transducer or other suitable pressure indicating unit which is adapted to supply a 4–20 mA signal to host computer 36 through peripheral interface panel assembly 38.

Again, referring to FIGS. 1–4, the overspray contaminants are captured and removed from the incoming stream of contaminated air 18 as it passes into and through the capture apparatus 19. More specifically, as indicated by the flow of directional arrows, the blower impeller 20 is utilized to draw contaminated spray booth air through a dry type multi-stage filtration system comprising an arrestor pad arrangement 40, a secondary prefilter arrangement 42, a primary prefilter 44, a main H.E.P.A. filter 46 and a gas separation filter 48.

Figure 1:
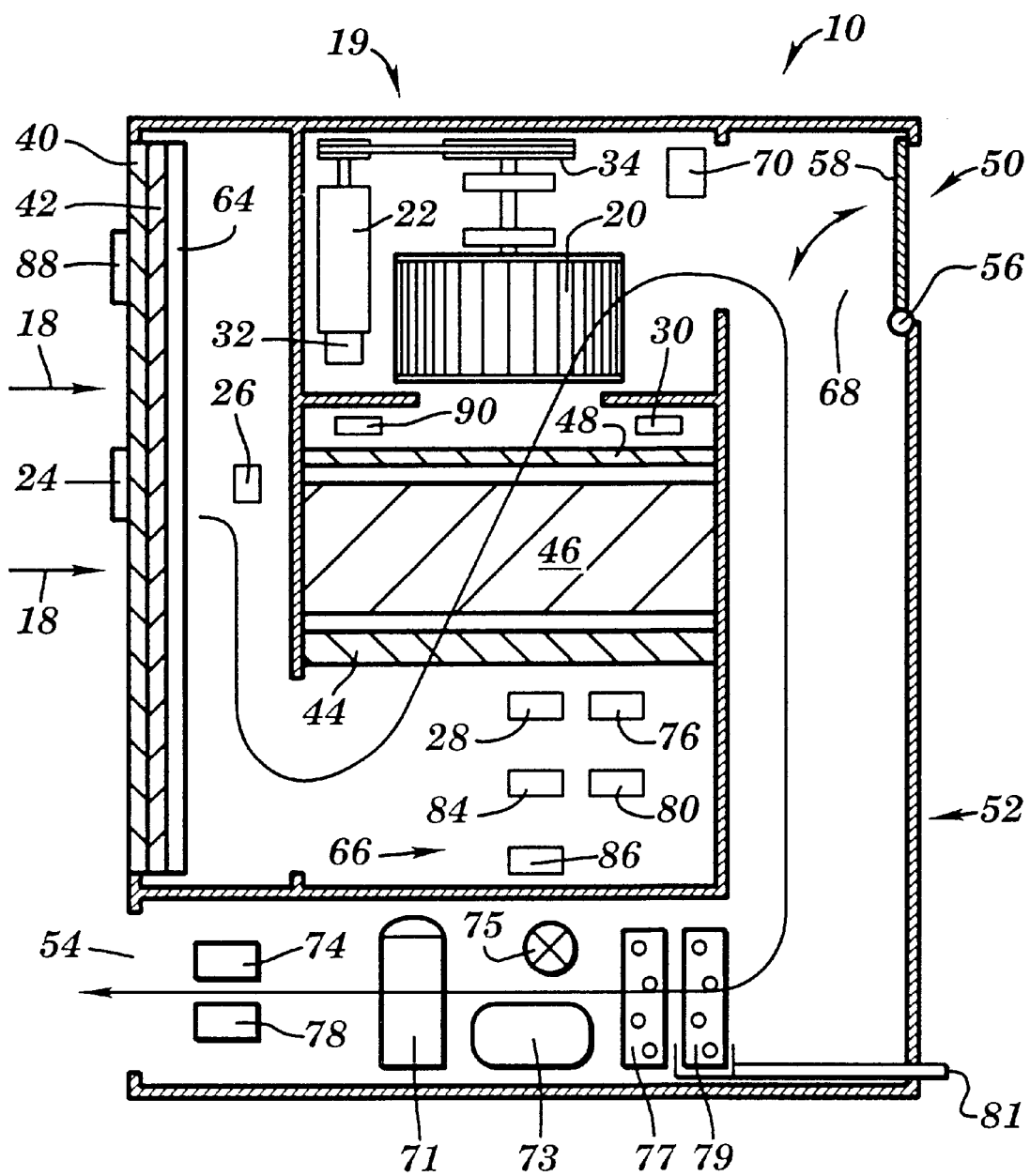
FIG. 1 illustrates the coating cycle airflow path through an automated air filtration and drying system in accordance with a second embodiment of the present invention.

After passing through the multi-stage filtration system, the filtered air is either expelled into the work environment through a coating cycle discharge port 50, or passed through a dehumidification module or system, generally designated as 52, and returned to the spray booth 12 through a drying cycle air outlet 54. As illustrated in FIGS. 1–4, a damper actuator 56, preferably including an electric motor drive and associated linkage, is utilized to regulate the position of a damper door 58 under control of host computer 36, thereby selectively directing the filtered air through the coating cycle discharge port 50 or into the dehumidification system 52. As stated above, the dehumidification system 52 may comprise either a heat-based system (FIGS. 2–4) or a refrigeration-based system (FIG. 1).

The invention, as shown in FIGS. 1–4 and 16, also has the additional distinct advantage of providing an automated filtration and drying system 10 that is easily mounted, or coupled, to a drying booth 12. These embodiments only require a single interface wall unit between the drying booth 12 and the filtration and drying system 10. Thus, the design, manufacture and usability of the drying booth are greatly enhanced. Moreover, the interface wall need only provide an opening for removing air 18 and returning air 54. The interface wall unit may be comprised of filtering devices 40, 42 and 64 and a return duct 54. Therefore, unlike other systems, these embodiments do not require underground or roof mounted equipment.

Figure 4:
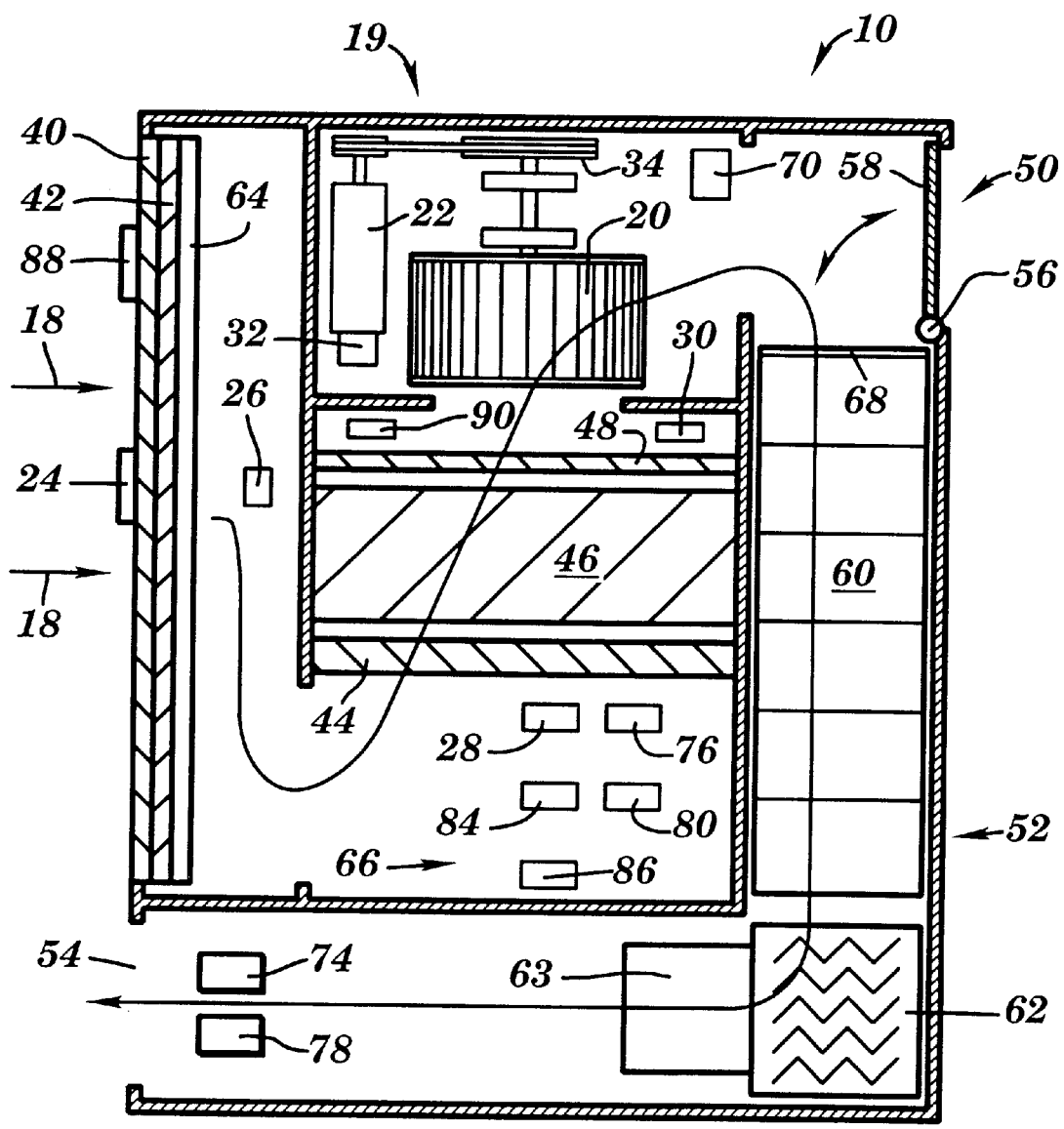
FIG. 4 illustrates the drying cycle airflow path through the automated air filtration and drying system of FIG. 2.

Referring now to FIGS. 2–4, the first embodiment (which incorporates a heat-based system) is illustrated. This system preferably utilizes a regenerative twin tower dryer including hydro-absorber banks 60, regenerator assembly 62 and a computer controlled heating element 63 which may be separate from or integral with regenerator assembly 62.

The coating cycle airflow path through the present invention is illustrated in FIG. 3. As indicated by directional arrows 18, air, which has been contaminated by overspray, is drawn into the automated air filtration and drying system 10 by the blower impeller 20 and subsequently passes through the arrestor pad arrangement 40, the secondary prefilter arrangement 42 and a quadrant diffusion system 64. After advancing past a sensor array area 66, the partially filtered air passes through the primary prefilter 44, the main high efficiency particulate air filter (H.E.P.A.) 46, the gas separation filter 48 and the blower impeller 20. During the coating cycle, the damper door 58 is secured over the intake 68 of the dehumidification system 52, and the filtered air is directed into the work environment through the coating cycle discharge port 50.

Figure 16:
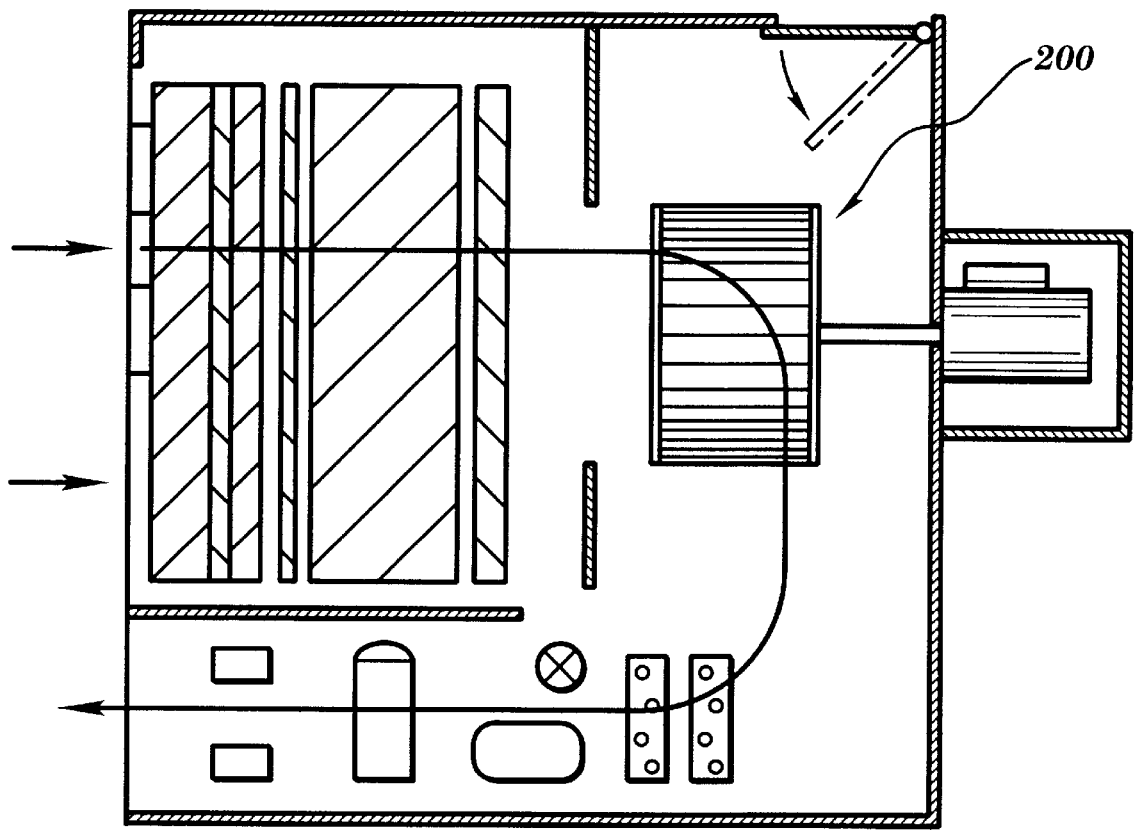
FIG. 16 illustrates an automated air filtration and drying system for a drying/spray booth incorporating a horizontally mounted impeller fan device in accordance with this invention.

Referring to FIG. 16, an additional embodiment is shown. This embodiment is essentially the same as those shown in FIGS. 1–4, except that the blower impeller 200 (20 of FIGS. 1–4) is horizontally mounted on the rear wall rather than vertically mounted on the ceiling. It is envisioned that either a heat based or refrigeration based drying system could be utilized therein.

As evidenced by a comparison of FIGS. 3 and 4, the initial portions of the drying cycle and coating cycle airflow paths are identical. Namely, referring now specifically to FIG. 4, air from the spray booth is drawn by the blower impeller 20 through the arrestor pad arrangement 40, the secondary prefilter arrangement 42, the quadrant diffusion system 64, the sensor array area 66, the primary prefilter 44, the main H.E.P.A. filter 46 and the gas separation filter 48. Unlike the coating cycle airflow path, however, the filtered air is directed into the drying module 52 during the drying cycle after passing through the blower impeller 20. More specifically, during the drying cycle, the damper door 58 is secured over the coating cycle discharge port 50, and the filtered air is conducted into the dehumidification system 52 through the intake 68 thereof. After flowing through the hydro-absorber banks 60, the regenerator assembly 62 and the computer controlled heating element 63 of the dehumidification system, the filtered, heated and dehumidified air exits the dehumidification system through the drying cycle air outlet 54 and passes into the spray booth. The filtered, heated and dehumidified air is subsequently passed over a coated product which is drying within the spray booth to further absorb and eliminate moisture therefrom, before again being drawn into the air filtration and drying system 10 by the blower impeller 20. Advantageously, the spray booth air is continuously filtered, dehumidified and heated as it is recycled through the multi-stage filtration system and the dehumidification system 52, thereby drastically reducing the drying times required for waterborne based coatings.

Referring now to FIG. 1, a second embodiment (which incorporates a refrigeration-based system) is illustrated. This system is functionally equivalent to the first embodiment with the exception of the components located within the dehumidification system 52. The air filtering mechanisms are equivalent in both embodiments. Thus, the two embodiments will only function differently when damper door 58 is closed and the air flow is forced into the dehumidification system 52 (see FIGS. 1 and 4). Under this second embodiment, the hydro-absorber bank 60, the regenerator assembly, and the computer controlled heating element 63 of the first embodiment (FIGS. 2–4) are removed. Instead, the present system will typically utilize components that may include a compressor 71, a liquid refrigerant or receiver tank 73, an expansion valve 75, a condenser or reheat coil 77, an evaporator or cooling coil 79 and a drain 81.

As noted, when the damper door 58 is closed the air is forced into the dehumidification system 52. The air, which is therein subjected to a refrigeration system, is chilled below its dew point temperature to then give up moisture in the form of condensation on the nearest surface it encounters. The dryer air is then passed back into the spray booth via outlet 54 where it acts as a sponge absorbing moisture from the coating on the product. The components that make up the refrigeration system are typical of the present art.

Figure 17:
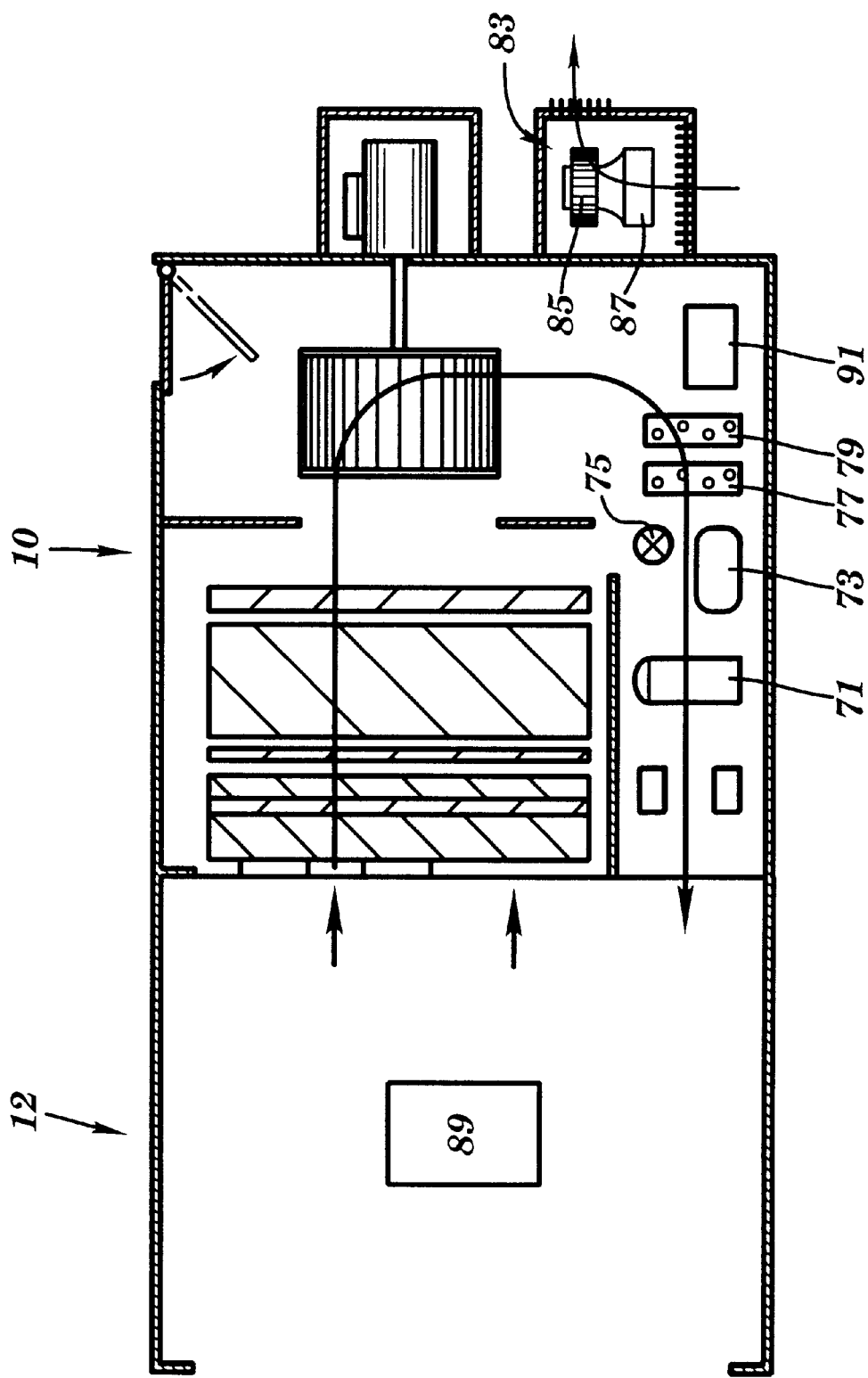
FIG. 17 illustrates an automated air filtration and drying system that incorporate a remote condenser and drying booth with an open wall in accordance with this invention.
Figure 18:
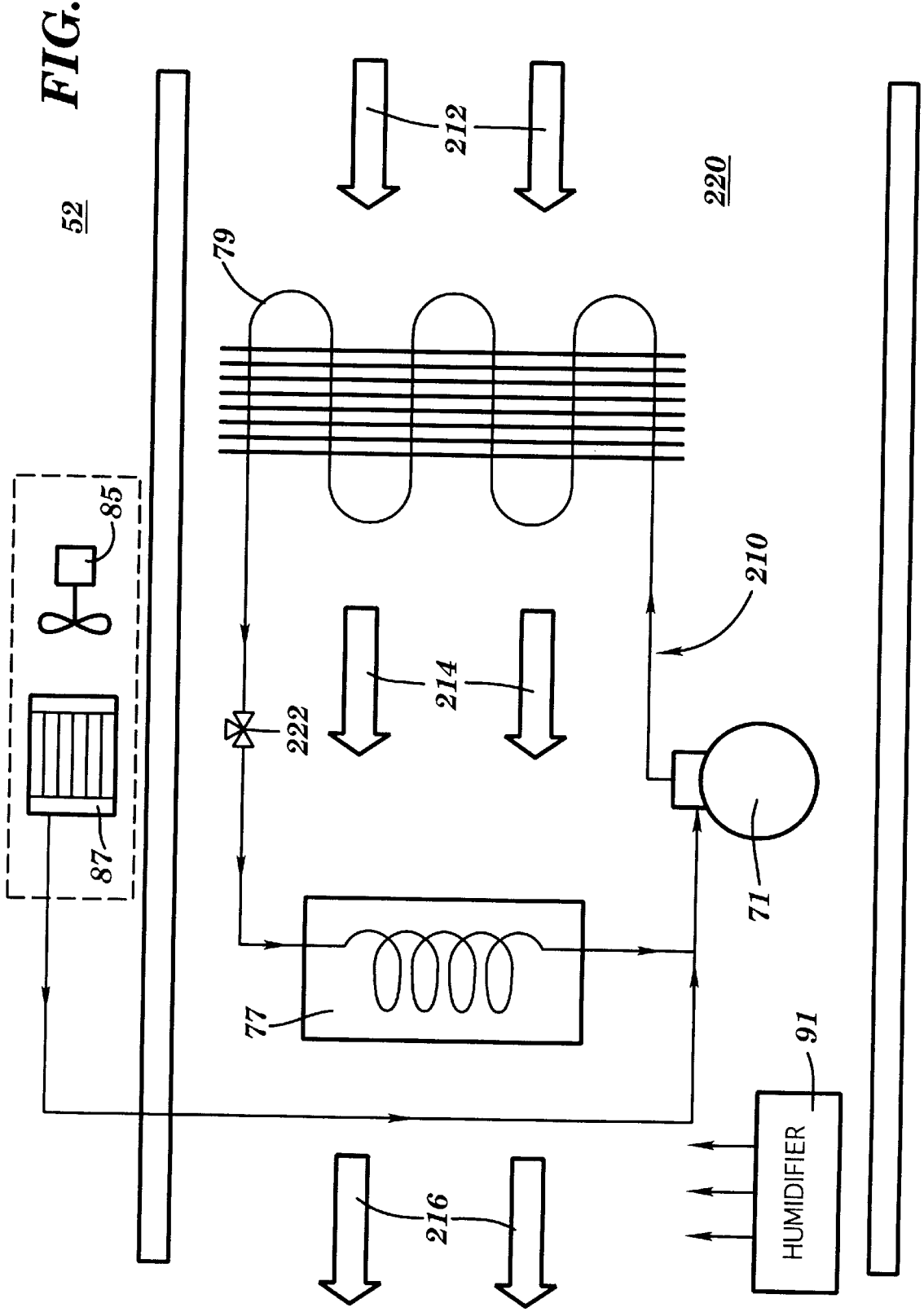
FIG. 18 illustrates the temperature and humidity control components in accordance with this invention.

Referring now to FIG. 17, a drying/filtration system is depicted that further includes a remote condenser unit 83 and a humidifier 91. The remote condenser unit 83 includes a condenser coil 87 and a cooling fan 85. The operation of the remote condenser unit 83 and the humidifier is further detailed in FIG. 18. FIG. 18 depicts a dehumidification system 52 for maintaining a predetermined temperature and humidity that may be located within the drying/filtration module. Moist air 212 first enters into the enclosed passageway 220 and is cooled by evaporator 79. In addition to cooling, evaporator 79 removes the moisture from the air to create a cool dry air 214. The moisture from the evaporator 79 is thereafter drained away (not shown). After the air is cooled, it passes through a reheat coil 77, which creates a warm dry air 216. Warm dry air 216 can then be passed back into the drying booth to collect moisture from a wet coated surface. Compressor 271 drives the system by pumping a refrigerant fluid 210 into the evaporator 79. Because this process warms up the refrigerant fluid, the reheat coil 77 can be used to reheat the cold air to a suitable temperature. However, if the refrigerant gets too hot, a solenoid valve 222 or the like can be used to redirect the refrigerant to a remote condenser 87, which is used to cool the refrigerant. The remote condenser 87 is located exterior to the drying/filtration system such that any unwanted heat can be removed from the system and exhausted into the work environment. A fan 85 may be used to further enhance the cooling effect of the remote condenser 87. Air temperature may therefore be regulated by a thermostat, PLC, or similar device (not shown). Based on a preset temperature, the solenoid 222 will decide whether or not to send refrigerant to the reheat coil 77 or the remote condenser 87.

As air is being continuously circulated throughout the system, the humidity is continuously dropping. A humidifier 91 may be used to introduce humidity back into to the system as needed to control the level of humidity in the system. Any known humidity detection system may be used in conjunction with the humidifier to allow a user to preset the humidity level. Thus, these components allow the user to control the drying environment by preselecting the exact temperature and humidity. Because different types of coatings, such as paint, require different drying conditions, such control in critical in obtaining across-the-board drying efficiency. With the disclosed components, this system can readily provide a temperature anywhere in the range of 45 to 125 degrees Fahrenheit and a relative humidity (RH) anywhere in the range of 25 to 95 percent. Choosing a particular system setting (e.g., 50° F., 45% RH) will depend on various factors including the thickness and type of coating. While it is envisioned that this system will accelerate drying for almost any water-based coating with a coating thickness of from 0.1 to 15 mils, it is not necessarily limited to such applications. It is also envisioned that performance outside of the above stated ranges could be reached by making relatively simple modifications to the drying/filtration system of the present invention.

Referring now to FIGS. 1–4 and 11, a volatile organic compound (VOC) breakthrough sensor 70 is utilized to detect the presence of organic solvent vapors and other volatile or hazardous vapors. The VOC breakthrough sensor 70 includes a sensing element, preferably having a vapor sensitive conductivity or the like, which is adapted to transmit a 4–20 mA signal to the host computer 36 through the peripheral interface panel assembly 38. If the host computer 36 determines that dangerous vapors are present in the system during the coating or drying cycles, in response to the output of the VOC breakthrough sensor 70, it will actuate the appropriate visual and/or audio alarms to advise personnel that a hazardous compound is present in the system and that immediate maintenance, perhaps due to a malfunctioning or improperly installed gas separation filter 48, is required.

The output of the VOC breakthrough sensor 70 is further utilized to control the operation of the damper actuator 56 and the dehumidification system 52, and the associated position of the damper door 58. More specifically, in response to a positive reading from the VOC breakthrough sensor 70 (VOC present), the host computer 36 sends a drying cycle disable signal through the peripheral interface panel assembly 38 to a dry system interlock 72, comprising an electromechanical relay or the like, resulting in the shut down of the dehumidification system 52 and the securement of the damper door 58 over the intake 68 of the dehumidification system 52 via damper actuator 56. Analogously, when a VOC is not detected, the VOC breakthrough sensor 70 outputs a negative reading to the dry system interlock 72, thereby enabling the damper door 58 and allowing the initiation or continuation of a drying cycle. Advantageously, the operational longevity of the desiccant within the hydro-absorber banks 60 (FIGS. 2–4) is greatly increased by preventing VOC contaminated air from entering the dehumidification system 52.

An outlet humidity sensor 74 and ambient humidity sensor 76 are utilized to monitor and control the operation of the dehumidification system 52. The outlet humidity and ambient humidity sensors 74, 76 preferably include a humidity sensitive element, having a humidity responsive AC resistance, and a thermistor which are adapted to compensate for the temperature dependency of the humidity sensitive element. Each humidity sensor provides a 4–20 mA signal which is fed to the host computer 36 through the peripheral interface panel assembly 38.

During the drying cycle, the outputs of the outlet and ambient humidity sensors 74, 76 provide the host computer 36 with data corresponding to the humidity of the air that is flowing out of the dehumidification system 52 and into the capture apparatus 19, respectively. When the humidity level measured by one or both of the humidity sensors falls below a predetermined humidity limit, indicating that a coated product within the spray booth 12 (FIG. 2) has dried/cured to a sufficient degree, the drying cycle is disabled via the dry system interlock 72, and the damper door 58 is subsequently secured over the intake 68 of the dehumidification system 52. Correspondingly, the drying cycle is enabled while the measured humidity level remains above the predetermined humidity limit during the drying cycle. In a similar manner, if the humidity level fails to reach the drying cycle humidity limit after a predetermined amount of time has elapsed, indicating possible system malfunction, the drying cycle is disabled.

The present invention incorporates outlet and ambient temperature sensors 78, 80, to provide the host computer 36 with outlet and ambient airflow temperature measurements, respectively. Preferably, each temperature sensor includes a thermistor and related circuitry to supply a 4–20 mA signal to the host computer 36 through the peripheral interface panel assembly 38. If the outlet and/or ambient temperature measurements deviate sufficiently from a predetermined, application specific, optimum drying temperature during the drying cycle, the host computer 36 transmits the necessary temperature adjustment signal to a temperature controller 82 which subsequently provides the appropriate temperature adjustment signal to the computer controlled heating element 63 (FIGS. 2–4) or the refrigeration system (Fig. 1) located within the dehumidification system 52.

Sensor area 66 further includes an airflow sensor 84, for measuring input airflow in cubic feet per minute (CFM), and an air velocity sensor 86 for measuring input air velocity in feet per minute (FPM), wherein the sensor outputs are supplied to host computer 36 through peripheral interface panel assembly 38. Preferably, the airflow sensor 84 and air velocity sensor 86 include an auto sensor tube assembly similar in construction to the above-described static pressure sensors 24, 26, 28, and 30, although any appropriate sensor technology may be utilized. The data obtained by sensors 84 and 86 is primarily utilized for system monitoring purposes. However, since airflow and air velocity are directly related to the degree of filtration loading, the outputs of sensors 84, 86 may be utilized by the host computer 36 in lieu of or in conjunction with the outputs of the static pressure sensors 24, 26, 28, 30, to thereby control the speed of the blower motor 22 via the variable frequency drive system 24.

Particulate sensors 88, 90, of a type known in the art, are utilized to provide the host computer 36 with measurements of the upstream (unfiltered) and downstream (filtered) particulate concentrations, respectively. If the particulate concentrations deviate from expected values, or if decontamination efficiency of the capture apparatus 19 falls below a predetermined minimum level, the host computer 36 is adapted to output the necessary status information to a system operator.

Figure 11:
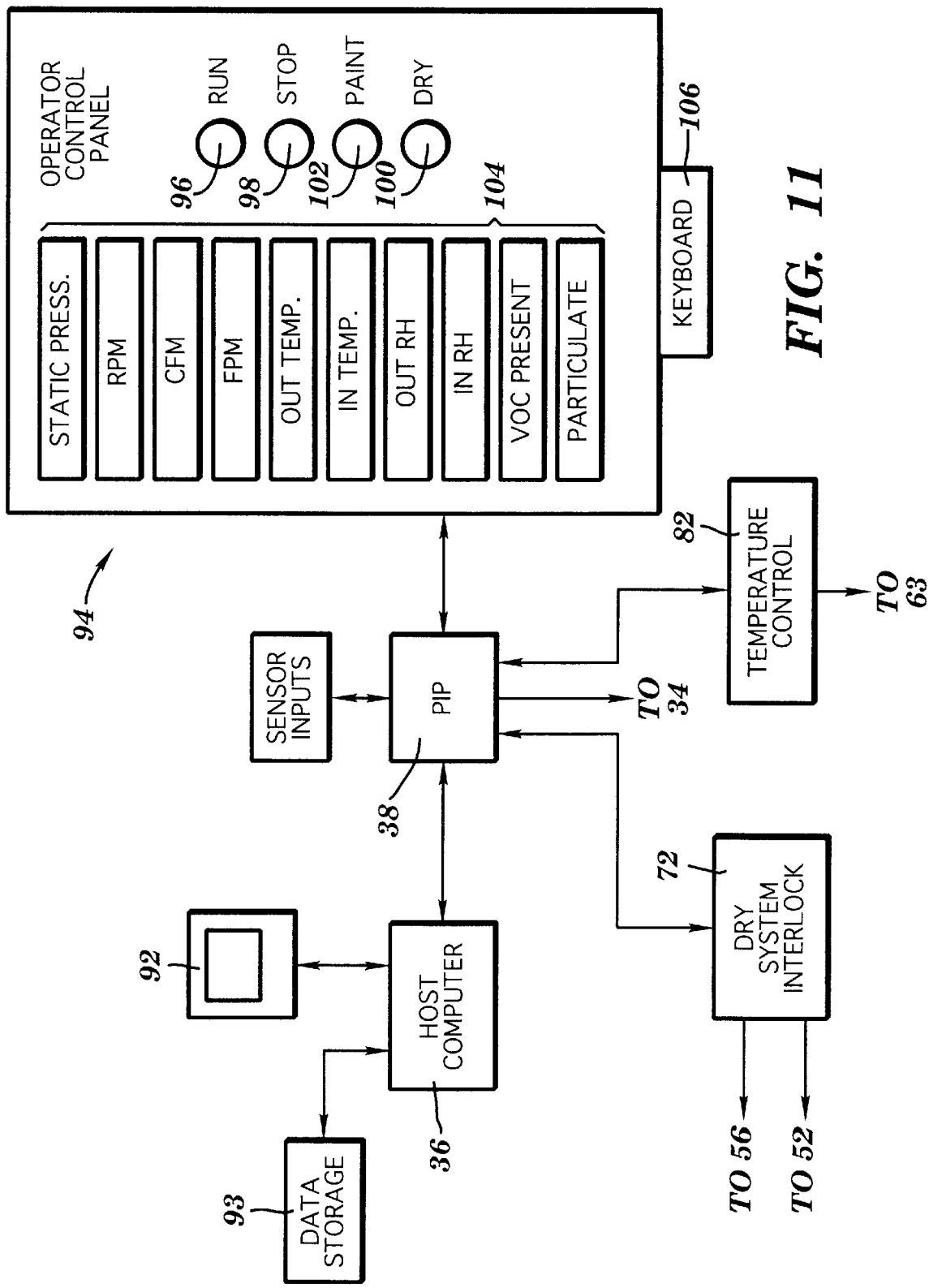
FIG. 11 is a block diagram of the energy and environmental management system.

Referring to FIG. 11 (and 2), there is illustrated, in partial block form, the energy and environmental management system according to the present invention. As stated above, the energy and environmental management system includes a host computer 36 for monitoring and controlling the operation of the automated air filtration and drying system 10. a peripheral interface panel assembly 38 is utilized to direct the system information received from the plethora of sensors disposed within the spray booth 12, the capture apparatus 19 and the dehumidification system 52 into the host computer 36 and to output any requisite control information to the appropriate computer actuated/controlled system components.

A display 92 is utilized to provide an operator with a visual indication of some or all of the sensor readings received by the host computer 36, thereby allowing the operator to monitor the operational status of the automated air filtration and drying system of the present invention. Preferably, a datalog of the received sensor readings is stored for future analysis in a data storage system 93 such as a hard disk drive or the like.

The energy and environmental management system includes an operator control panel 94 for controlling the basic operation of the air filtration and drying system, wherein the blower motor 22 and system controls are activated or deactivated by the manually actuated run and stop buttons 96 and 98, respectively, and the drying cycle is activated or deactivated by the manually actuated dry and paint buttons 100 and 102, respectively. The operator control panel 94 further includes a plurality of highly visible, multicolored status lights 104 which are adapted to quickly provide a system operator with system status information corresponding to static pressure, blower motor rpm, airflow, air velocity, outlet temperature, ambient temperature, outlet humidity, ambient humidity, VOC presence, particulate concentration and the like. Preferably, a green status light is utilized to indicate normal system operation within preset ranges, a yellow status light is utilized to indicate that the system is nearing diagnostic or maintenance stages and a red (flashing) status light is utilized to indicate system malfunction, system shutdown or the necessity of immediate system maintenance/repair. A keyboard 106 is provided on the operator control panel 94 for data analysis, record keeping and operational or application specific program updates/modifications, such as outlet temperature and humidity requirements, blower motor speeds and the like.

Figure 5:
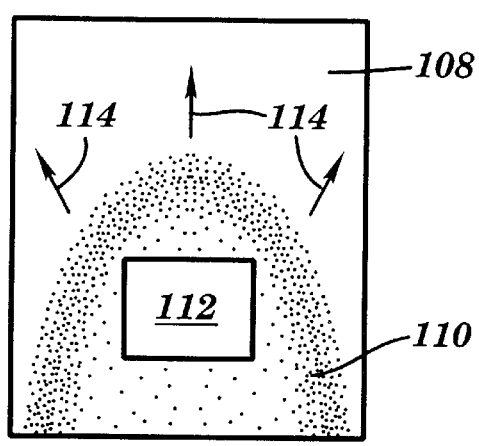
FIG. 5 illustrates the formation of an overspray impact pattern on the collection face of a prior art overspray filtration system.
Figure 6:
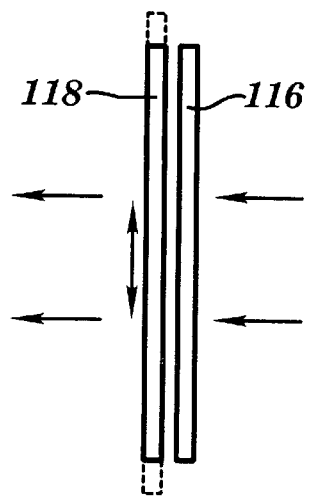
FIG. 6 is a top view of a quadrant diffusion system in accordance with the present invention.

Referring now to FIG. 5, the airflow across the collection face 108 of currently available overspray filtration systems oftentimes produces an unbalanced overspray impact pattern 110 on the collection face 108 as the overspray is drawn into the filtration system after passing around a product 112 being coated. As the underlying portion of the collection face 108 begins to clog, thereby preventing air from being drawn therethrough, the periphery of the overspray impact pattern 110 migrates outward as indicated by directional arrows 114.

To prevent the formation of such an unbalanced overspray impact pattern, the present invention provides a novel quadrant diffusion system 64 for producing a balanced flow of air across the collection face of the automated air filtration and drying system 10. As previously described with respect to FIGS. 1 and 3–4, the quadrant diffusion system 64 is preferably disposed behind the arrestor pad arrangement 40 and secondary prefilter arrangement 42.

Figure 7:
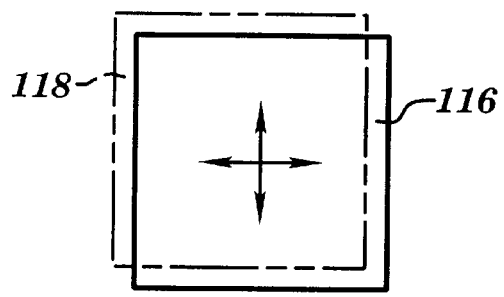
FIG. 7 is a front elevational view of the quadrant diffusion system of FIG. 6.
Figure 8:
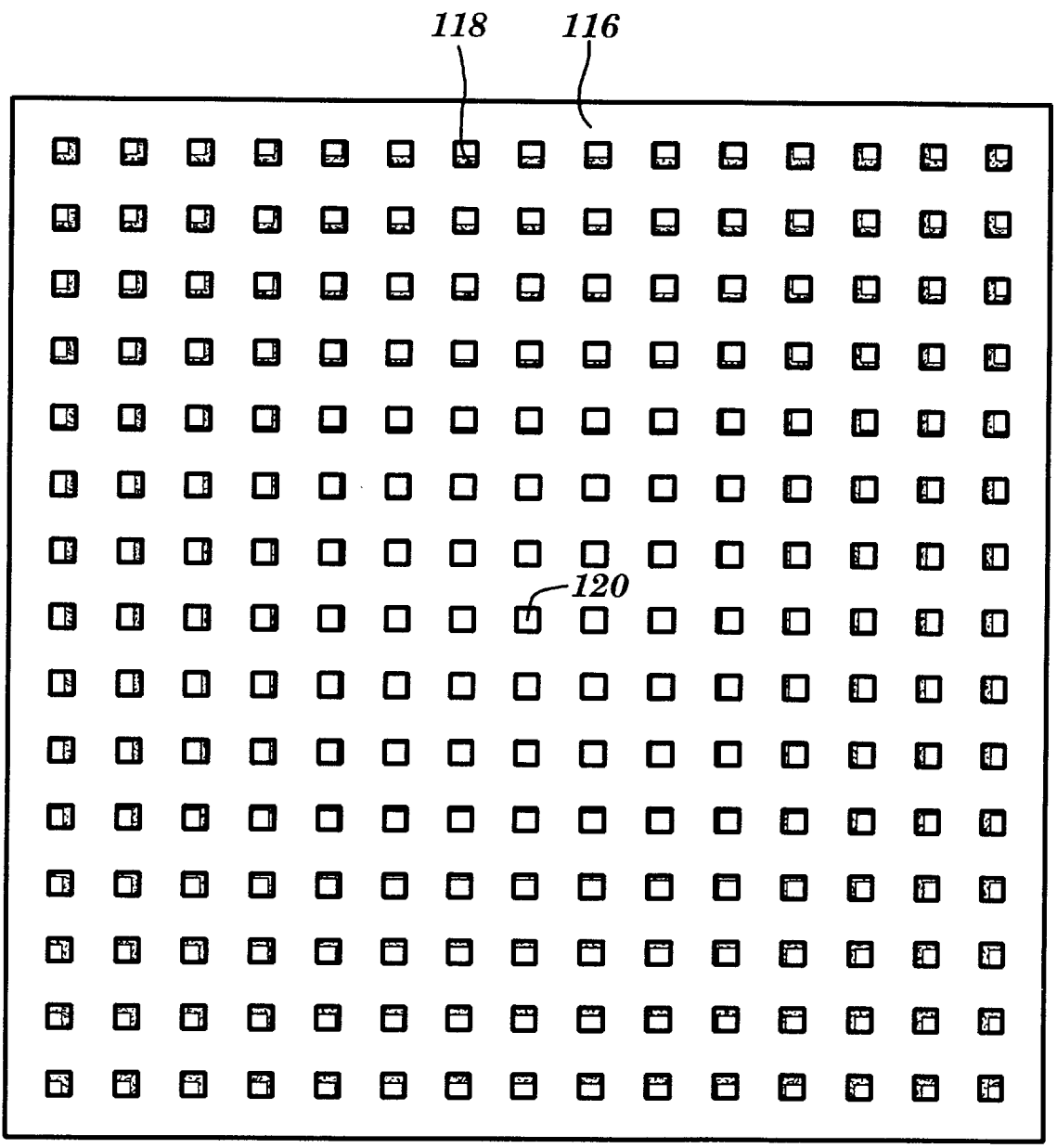
FIG. 8 is a front view of the quadrant diffusion system with the front and rear panels mutually centered.
Figure 9:
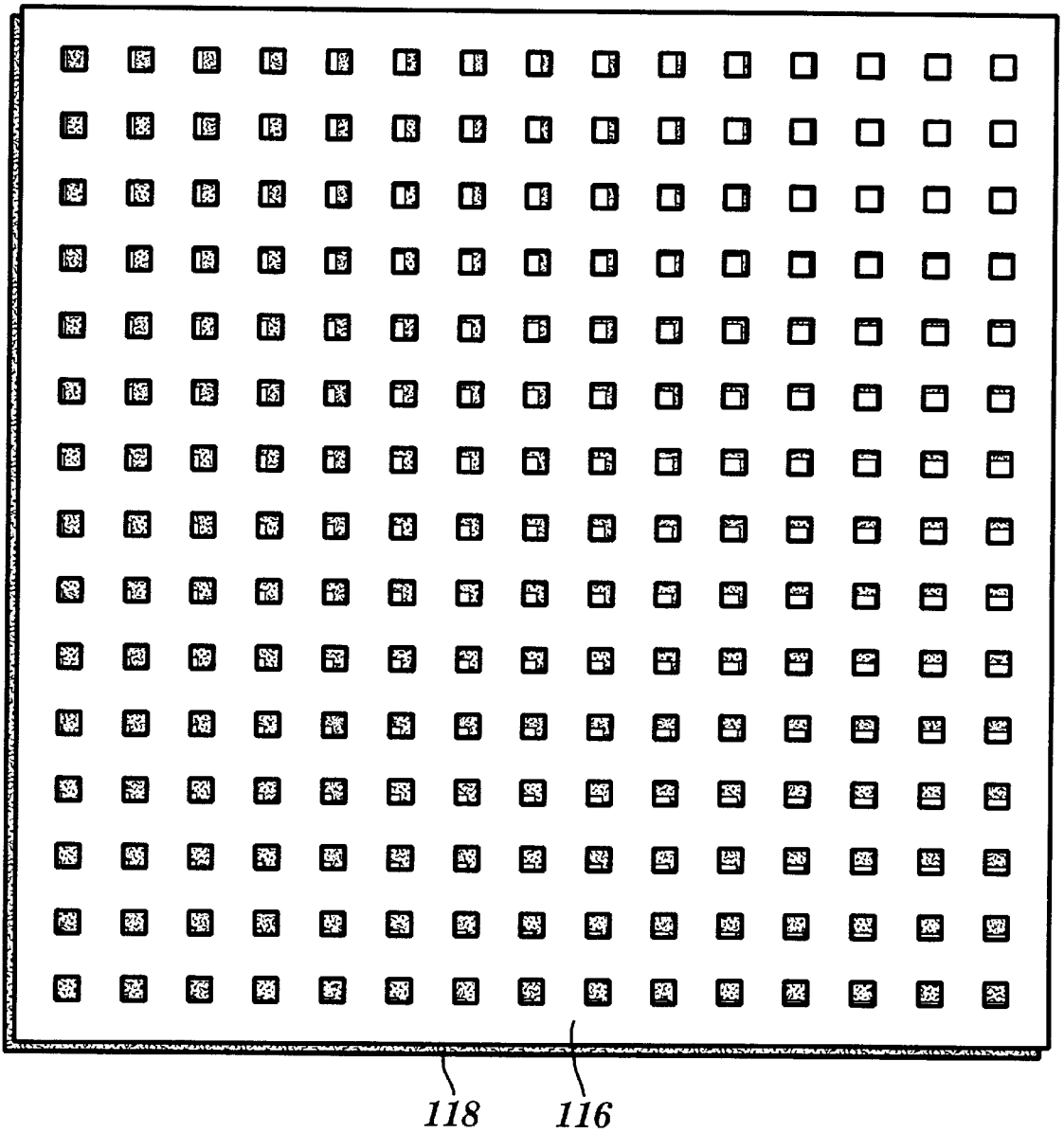
FIG. 9 is a front view of quadrant diffusion system with the rear panel shifted in a negative direction along the x and y-axes.

As illustrated in FIGS. 6–10, the quadrant diffusion system 64 includes at least one pair of overlapping, parallel panels 116, 118, each including a patterned series of apertures therethrough, wherein the pattern of apertures in each panel offers a minimal restriction to airflow. Although the front panel 116 and the rear panel 118 include the same number of apertures, the apertures on the rear panel incorporate a slightly larger center to center pattern. As such, the nominal flow center of air through the panels 116, 118 may be altered by moving the panels 116, 118 slightly off center from one another as illustrated in FIG. 7. Preferably, the front panel 116 remains stationary and the rear panel 118 is shifted as necessary along the x and y-axes to provide the required flow center of air. For example, as shown in FIG. 8, the nominal flow center of air occurs at aperture 120 when the panels 116, 118 are mutually centered. If the rear panel 118 is shifted in a negative direction along the x and y-axes, as depicted in FIG. 9, the nominal flow center of air is shifted toward the upper right region of the panel arrangement. As should be readily apparent, the nominal flow center through the parallel panels may be shifted as necessary in accordance to application specific requirements by altering the relative orientation of the front and rear panels 116, 118.

Figure 10:
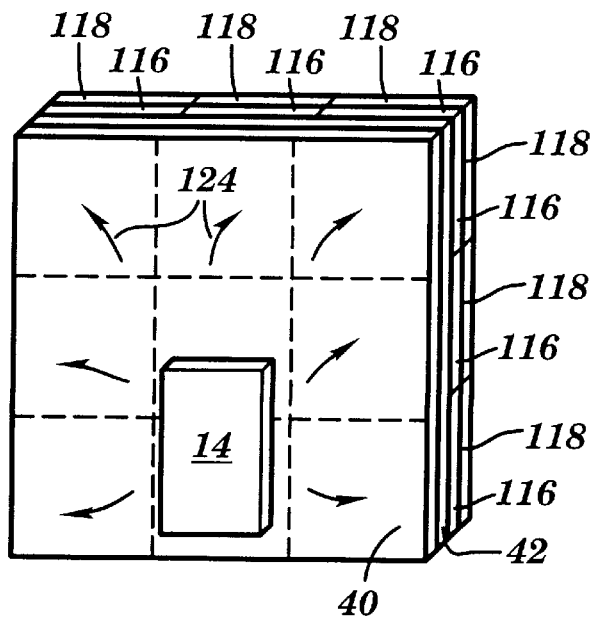
FIG. 10 illustrates a specific application of the quadrant diffusion system in the automated air filtration and drying system of FIGS. 1 and 2.

An application of the quadrant diffusion system 64, incorporating nine pairs of overlapping, parallel panels to balance the flow over the collection face (arrestor pad arrangement 40) of the air filtration and drying system 10, is illustrated in FIG. 10. More specifically, nine pairs of parallel panels 116, 118, are arranged in a three-by-three matrix behind the arrestor pad arrangement 40 and secondary prefilter arrangement 42, with the nominal flow center of air through each pair of panels 116, 118 adjusted to provide the airflow pattern indicated by directional arrows 124. Advantageously, the resultant overspray impact pattern produced while coating product 14 is distributed substantially equally over the entire collection face area of the arrestor pad arrangement 40, due to the balanced airflow provided by the quadrant diffusion system 64.

Referring now to FIGS. 12–15, several bar graphs are shown comparing drying times of a product in and out of a booth built in accordance with this invention. In each of the graphs represented in these figures, the clear bars represent drying time wherein the booth is utilized and the cross-hatched bars represent drying times wherein the booth is not utilized.

FIG. 12, which depicts the drying time of a round casting at a wetness of 4–5 MILS, shows that it only took 12.5 minutes for a casting to completely dry when placed in the booth as opposed to 69 minutes when not placed in the booth.

FIG. 13, which depicts the drying time of a round casting at 4–6 MILS with a fan blowing on the casting, shows that it only took 11.5 minutes for a casting to completely dry when placed in the booth as opposed to 69 minutes when not placed in the booth.

FIG. 14, which depicts the drying time for an assembled pump (2800 lbs.) at 6–8 MILS, shows that it only took 42.5 minutes for the pump to completely dry when placed in the booth as opposed to 123 minutes when not placed in the booth.

FIG. 15, which depicts the drying time for an assembled pump (2800 lbs.) at 3.5–5 MILS, shows that it only took 16.5 minutes for the pump to completely dry in the booth as opposed to 90 minutes when not placed in the booth.

As a result of the above described improvements in the temperature and humidity control system using a separate condenser and humidifier component, means are provided for achieving more control over proper drying by being able to preset the required RH and temperature. These RH and temperature control features have been found to be particularly important when affecting the drying of substrates treated with an aqueous (waterborne) based coating over a wide range of thicknesses and drying characteristics.

Based on these modifications, there is provided a method for drying an aqueous-based coating that was applied onto a substrate at a surface thickness of from about 0.1 to about 15 mils to provide a substrate having a substantially tack-free coated surface capable of resisting the formation of surface flaws, which method comprises, (1) flowing air substantially uniformly in an angular and/or parallel direction and at surface velocity of at least 10 feet per minute over the coated substrate surface, while maintaining the coated substrate in a drying environment having an RH in the range of about 25 to about 95 percent, and a temperature in the range of about 45 F. to about 125 F., and (2) continuing the procedure of step (1) in a continuous or batch mode until the coated substrate surface is substantially dry (i.e., tack-free) and blemish-free after normal handling procedures. It should be noted, however, that in some applications, the waterborne coating, when substantially or completely dry, may retain a degree of tackiness. This may occur, for example, when the coating is an adhesive.

The procedure of step (1) does not necessarily have to be continued until the coated substrate surface is substantially or completely dry. In some applications, for example, it may be desirable to partially dry the coating to a predetermined level.

It should be recognized that the system and method described herein are particularly effective in accelerating the drying of most waterborne coatings when the temperature is set between 65 and 80 degrees Fahrenheit and the RH is set between 25 to 45%.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. A method for drying an aqueous-based paint which was applied onto a substrate at a surface thickness of from about 0.1 to about 15 mils to provide a substrate having a painted surface, which method comprises the steps of:

(1) flowing air substantially uniformly and at a surface velocity of at least 10 feet per minute over the painted substrate surface, while maintaining the painted substrate surface in a drying environment having an RH in the range of about 25 to about 95 percent, and a temperature in the range of about 45 F. to about 125 F., and (2) continuing the procedure of step (1) in a continuous or batch mode until the painted substrate surface is substantially dry.

2. The method of claim 1, wherein said maintaining step further includes the step of:

providing a dehumidification system that circulates recycled air to maintain said painted substrate surface in said drying environment having an RH in the range of about 25 to about 95 percent, and a temperature in the range of about 45 F. to about 125 F.

3. The method of claim 2, further including the step of filtering said recycled air.

4. A method for drying an aqueous-based coating which was applied onto a substrate at a surface thickness of from about 0.1 to about 15 mils to provide a substrate having a coated surface, which method comprises the steps of:

(1) flowing air substantially uniformly and at a surface velocity of at least 10 feet per minute over the coated substrate surface, while maintaining the coated substrate surface in a drying environment having an RH in the range of about 25 to about 95 percent, and a temperature in the range of about 45 F. to about 125 F., and (2) continuing the procedure of step (1) in a continuous or batch mode until the coated substrate surface is substantially dry.

5. The method of claim 4, wherein said maintaining step further includes the step of:

providing a dehumidification system that circulates recycled air to maintain said coated substrate surface in said drying environment having an RH in the range of about 25 to about 95 percent, and a temperature in the range of about 45 F. to about 125 F.

6. The method of claim 5, further including the step of filtering said recycled air.

7. The method of claim 4, wherein said aqueous-based coating is a primer.

8. The method of claim 4, wherein said aqueous-based coating is an adhesive.

9. The method of claim 4, wherein said aqueous-based coating is a sealant.

10. The method of claim 4, wherein said aqueous-based coating is a masking material.

11. The method of claim 4, wherein said aqueous-based coating is a temporary coating.

12. The method of claim 4, wherein said aqueous-based coating is a wax.

13. The method of claim 4, wherein said aqueous-based coating is an ink.

14. The method of claim 4, wherein said aqueous-based coating is a mold release compound.

15. A method for drying an aqueous-based coating which was applied onto a substrate at a surface thickness of from about 0.1 to about 15 mils to provide a substrate having a coated surface, which method comprises the steps of:

(1) flowing air substantially uniformly and at a surface velocity of at least 10 feet per minute over the coated substrate surface, while maintaining the coated substrate surface in a drying environment having an RH in the range of about 25 to about 95 percent, and a temperature in the range of about 45 F. to about 125 F., and (2) continuing the procedure of step (1) in a continuous or batch mode until the coated substrate surface achieves a suitable dryness level.

16. The method of claim 15, wherein said maintaining step further includes the step of:

providing a dehumidification system that circulates recycled air to maintain said coated substrate surface in said drying environment having an RH in the range of about 25 to about 95 percent, and a temperature in the range of about 45 F. to about 125 F.

17. The method of claim 16, further including the step of filtering said recycled air.

18. The method of claim 15, wherein said aqueous-based coating is a primer.

19. The method of claim 15, wherein said aqueous-based coating is an adhesive.

20. The method of claim 15, wherein said aqueous-based coating is a sealant.

21. The method of claim 15, wherein said aqueous-based coating is a masking material.

22. The method of claim 15, wherein said aqueous-based coating is a paint.

23. The method of claim 15, wherein said aqueous-based coating is a wax.

24. The method of claim 15, wherein said aqueous-based coating is an ink.

25. The method of claim 15, wherein said aqueous-based coating is a temporary coating.

26. The method of claim 15, wherein said aqueous-based coating is a mold release compound.

* * * * *